Aug. 1, 1939.         C. V. JOHNSON              2,167,928
                       SHOCK STRUT
              Filed Dec. 30, 1936        3 Sheets-Sheet 1

INVENTOR.
CARL V. JOHNSON
BY
A. E. Wilson
ATTORNEY.

Aug. 1, 1939.   C. V. JOHNSON   2,167,928
SHOCK STRUT
Filed Dec. 30, 1936   3 Sheets-Sheet 2
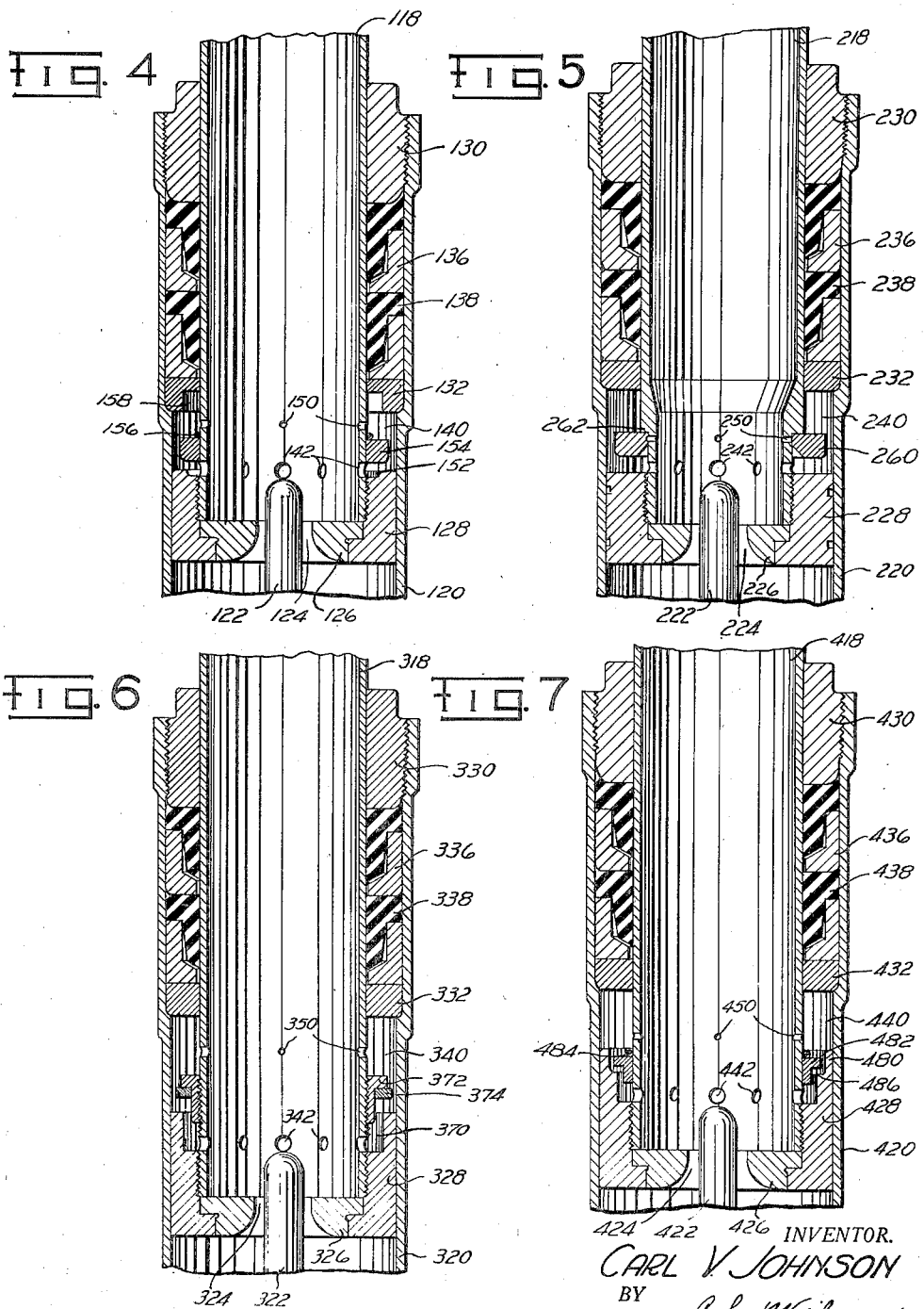
INVENTOR.
CARL V. JOHNSON
BY
R. E. Wilson
ATTORNEY Aug. 1, 1939.   C. V. JOHNSON   2,167,928
SHOCK STRUT
Filed Dec. 30, 1936   3 Sheets-Sheet 3
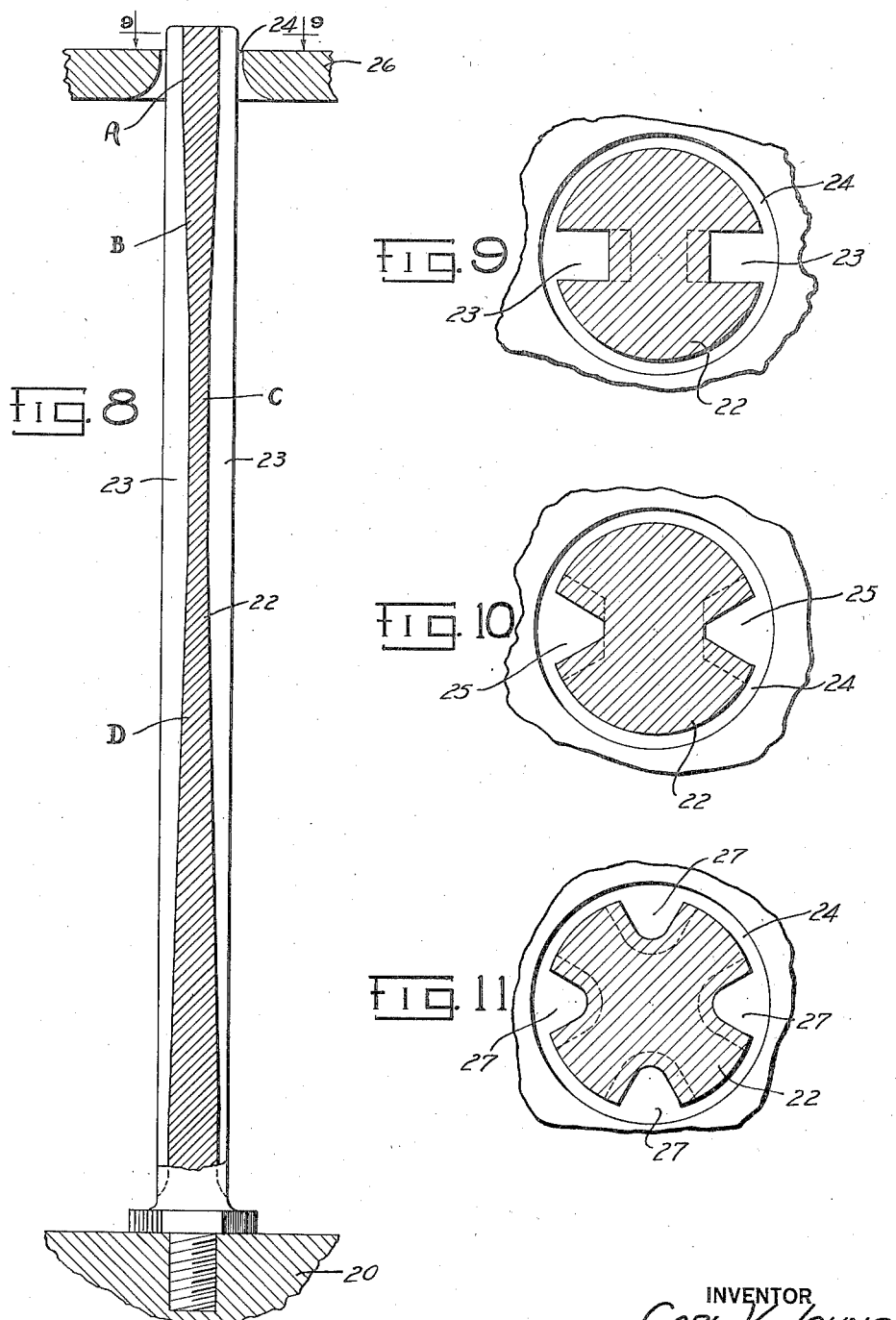
INVENTOR
CARL V. JOHNSON
BY
A. E. Wilson
ATTORNEY Patented Aug. 1, 1939

2,167,928

UNITED STATES PATENT OFFICE 2,167,928

SHOCK STRUT

Carl V. Johnson, South Bend, Ind., assignor to Bendix Products Corporation, South Bend, Ind., a corporation of Indiana Application December 30, 1936, Serial No. 118,202

16 Claims. (Cl. 267—64)

This invention relates to shock absorbing struts of the hydro-pneumatic type, and more particularly to means to improve the efficiency, and to decrease the cost of manufacturing such struts.

It is customary in hydro-pneumatic shock struts to meter a liquid from one chamber into another chamber, through a variable effective area orifice positioned between the chambers, to absorb the load to which the strut is subjected. When the load is released, the chambers are separated by yielding means associated with one of them.

It has been found that when the load is suddenly released from the strut, the chambers separate too rapidly, thereby subjecting the retaining means holding the strut members from separating to rather severe impact loads. This tendency of the strut to move to the extended position too rapidly has in the past been overcome by positioning a check tube around the metering pin. The check tube incorporated a check valve to permit the liquid to flow freely through the orifice separating the chambers when the strut was subjected to load. When the load was removed from the strut and it was moving toward the extended position, the flow of liquid to the orifice between the chambers was restricted. The rapidity with which the strut could move to the extended position was thus controlled.

It has also been found that the metering pins of shock absorbing struts, which have relatively long taper pins with large clearance in the orifice are, under certain operating conditions, subject to vibration which cause the metering pin to hammer the member forming the orifice, enlarging it and varying the flow characteristics of the liquid from one chamber to the other.

An object of this invention is therefore to provide means to delay the separation of the telescoping members of a shock absorbing strut.

A further object is to utilize the space between the movable elements of a shock strut to trap liquid to control the rapidity of the separating movement of the strut.

Another object is to provide a reservoir to receive liquid, through a check valve, when the strut is compressed, and a metering orifice controlling the rate of liquid flow from the reservoir to control the rate of extension of the shock strut.

A still further object of the invention is to provide a concentrically disposed expansible liquid chamber between the telescoping cylinders of a shock strut wherein means are provided to vary the rate of liquid flow to and from the concentric chamber by a pressure actuated valve to control the rate of relevant movement between the cylinders.

Yet a further object of the invention is to provide a constant diameter metering pin having spaced grooves in its side walls adapted to project through a fixed orifice to control the rate of liquid flow through the orifice.

Another object is to form a constant diameter, limited vibration, metering pin having a plurality of spaced grooves of variable depth adapted to project through a fixed orifice to control the rate of liquid flow through the orifice and to equalize liquid pressure around the metering pin.

Other objects and advantages of this invention will be apparent from the following detailed description thereof, considered in connection with the accompanying drawings, submitted for purposes of illustration only, and not intended to define the scope of the invention, reference being had for that purpose to the subjoined claims.

In the drawings, wherein similar reference characters refer to similar parts throughout the several views:

Figure 4 is a view similar to Figure 3 showing a modified form of the invention;

Figure 5 is a view similar to Figure 3 showing a further modified form of the invention;

Figure 6 is generally similar to Figure 3 and shows another embodiment of the invention;

Figure 7 is also a view similar to Figure 3, and shows a still further modified form of the invention;

Figure 8 is a vertical section through the metering pin and orifice assembly of this invention;

Figure 9 is a view taken substantially on the line 9—9 of Figure 8;

Figure 10 is a view similar to Figure 9 showing a modified form of the invention; and Figure 11 is also a view similar to Figure 9, showing a still further modified form of the invention.

Figure 1:
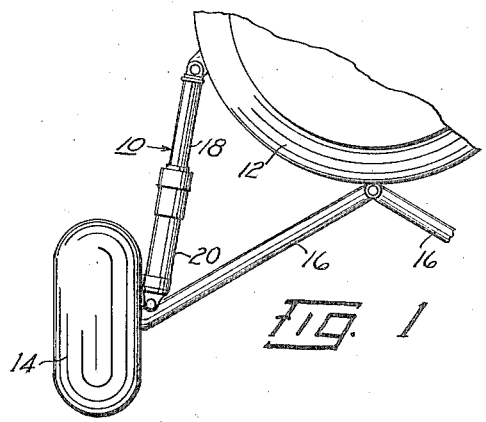
Figure 1 is a view showing a shock absorbing strut embodied in an airplane.
Figure 2:
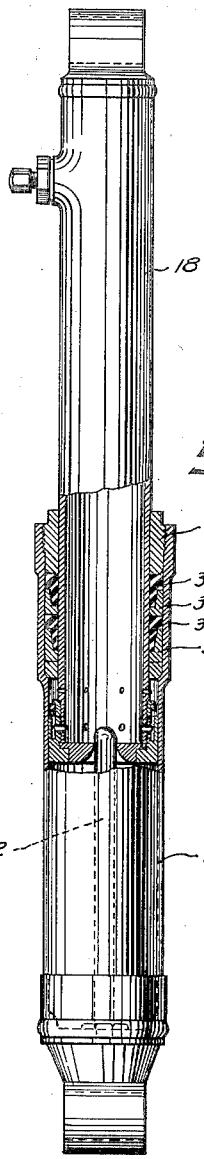
Figure 2 is a side elevation, partly in section, of a shock strut embodying the present invention.
Figure 3:
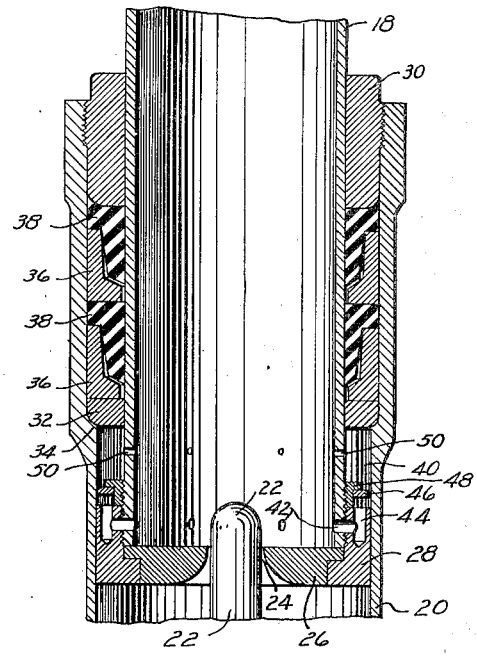
Figure 3 is an enlarged sectional view of a portion of Figure 2.

Referring more particularly to Figures 1 to 3 there is shown for purposes of illustrating this invention, a shock absorbing strut 10 interposed between a portion of a fuselage 12 of an airplane, and a landing wheel 14. One or more auxiliary support members 16 may be employed to securely connect the wheel 14 to the fuselage 12.

As will be observed, the shock strut 10 is mounted in the substantially vertical position. It comprises an upper or fluid cylinder 18 connected to the fuselage 12, adapted to slide into a liquid cylinder 20 connected to the member supporting the wheel 14.

Referring more particularly to Figures 2 and 3 it will be observed that a metering pin 22 fixed in the cylinder 20 projects through an orifice 24 formed in a member 26 closing the lower end of the cylinder 18. The cylinder 20 is normally filled with a liquid, and the cylinder 18 is normally filled with a liquid and a compressible fluid such for example as air. When the strut 10 is subjected to load, liquid flows from the cylinder 20 through the orifice 24 past the metering pin 22, into the cylinder 18. The force of the load to which the strut is subjected is absorbed and either dissipated or stored by forcing the liquid to flow through the orifice and by compressing the fluid in the chamber 18.

The cylinders 18 and 20 are guided and kept in proper telescoping relation by rings 28 and 30 threaded on the ends of the cylinders 18 and 20 respectively as shown. A ring 32 carried by a shoulder 34 formed in the cylinder 20 cooperates with the rings 30 and 36 to compress packing rings 38 therebetween to prevent leakage of liquid from the strut.

A concentric chamber 40 is formed between the cylinders 18 and 20 and the relatively movable rings 28 and 32. The chamber 40 communicates with the interior of the cylinder 18 by means of horizontally and vertically disposed ports 42 and 44. These ports may be of any desired size and number to admit liquid to the chamber 40 when the cylinder 18 slides into the cylinder 20. The ports 44 may be controlled by a pressure actuated check valve 46 movable between a stop member 48 threaded onto the cylinder 18 and the upper surface of the ring 28. Metering orifices 50, extending through the walls of the cylinder 18 communicate with the chamber 40.

The operation of this device is as follows. When the strut 10 is subjected to load, the cylinder 18 is forced downwardly into the cylinder 20, whereupon liquid from the cylinder 20 is forced through the orifice 24, past the metering pin 22 into the cylinder 18. As the cylinders move relative to each other the volume of the concentric chamber 40 increases, whereupon suction is created therein to draw liquid through the ports 42, 44 and 50, past the check valve 46 into the chamber 40. When the telescoping action ceases the pressure of the compressed fluid in the cylinder 18 urges the cylinders 18 and 20 apart. When the cylinders begin to separate pressure is exerted in the chamber 40, whereupon the check valve 46 is forced to its seat to close the ports 44. The liquid in the chamber 40 is then forced through the metering ports 50 into the cylinder 18. The size and number of the metering orifices 50 may of course be varied to control the rate of separating movement of the cylinders 18 and 20 as desired. As the strut approaches the fully extended position, the orifices 50 pass under the ring 32 thereby reducing the rate of flow of liquid from the progressively decreasing chamber 40 to an amount determined by clearances around the piston and the piston tube. When the strut reaches the fully extended position, the stop member 48 engages the ring 32 to prevent separation of the cylinders.

The modified embodiments of the invention illustrated in Figures 4 to 7 are similar in many respects to the embodiment illustrated in Figures 2 and 3, corresponding reference numerals with the addition of 100 in each of these figures having therefore been applied to corresponding parts.

In the embodiment illustrated in Figure 4, the ports 142 extending through the walls of the cylinder 118 communicate with the concentric chamber 140. The upper end of the ring 128 is shaped to form a shoulder 152 proportioned to be engaged by the outer edge of a ring 154. The ring 154 is slidably mounted on the cylinder 118, and in its extreme upward position engages a stop member or ring 156. The ring 154 thus forms a check valve which moves away from the shoulder 152 of the ring 128 to permit communication between the inside of the cylinder 118 and the chamber 140 when the cylinders 118 and 120 are moving in the telescoping direction. When the cylinders 118 and 120 separate, the volume of chamber 140 decreases whereupon fluid pressure is developed in the chamber which cooperates with the force of gravity to urge the ring 154 downwardly to close the ports 142. The liquid in the chamber 140 is then metered through the orifices 150 to control the rate of the extending movement of the strut. The ring 132 is formed with a notch 158 to receive the stop member 156. When the strut reaches the fully extended position the ring 154 contacts the rings 128 and 132 to prevent separation of the cylinders 118 and 120. It will also be observed that in this embodiment of the invention, the orfices 150 are closed by the ring 132 when the strut is in the fully extended position.

In the embodiment illustrated in Figure 5, a ring 260 is slidably mounted on the cylinder 218 between the ring 228. The ring 260 may move between a shoulder or stop 262 formed on the cylinder and the upper end of the ring 228. The ports 242 communicate with the chamber 240 above the ring 228, and the metering orifices 250 communicate with the chamber 240 below the shoulder 262. The ring 260 is preferably proportioned to close the ports 242 or the metering orifices 250 when moved to one extreme position or the other.

When the strut is subjected to load, and the cylinder 218 slides into the cylinder 220, the chamber 240 is enlarged. Suction is therefore exerted in the chamber 240 to move the ring 260 against the stop 262 and draw liquid into the chamber 240 through the ports 242.

When the strut is expanded pressure is exerted in the chamber 240, whereupon the ring 260 is forced downwardly to close the ports 242 and open the metering orifices 250. The liquid in the chamber 240 is then metered through the orifices 250 to retard the expanding movement of the strut. In the fully extended position the ring 260 is engaged by both of the rings 228 and 232 to prevent separation of the cylinders. It will be understood that if desired the metering orifice 250 may be positioned above the shoulder 262 in such a position as to be closed by the ring 232.

In the embodiment illustrated in Figure 6, the ring 328 is formed with an inner groove, forming a concentric space 310 between the upper end of the ring 328 and the cylinder 318. A stop ring 372 is fixed to the cylinders 318 adjacent the upper end of the ring 328. The ports 342 project through the walls of the cylinder 318 below the stop ring 372 and communicate with the concentric space 370. A check valve which may be in the form of a disc 374 is slidably mounted between the upper end of the ring 328 and the stop ring 372. The disc 374 operates to open communication between the ports 342 and the chamber 340 when the strut is collapsing and the chamber 340 is therefore increasing in volume, and to close communication between the chamber 340 and the ports 342 when the strut is expanding and the chamber 340 is subjected to pressure. When the strut is expanding the liquid in the chamber 340 is of course metered through the metering orifices 350 to control the rate of expansion of the strut.

In the fully extended position the metering orifices are closed by the ring 332 and the stop ring 372 engages the ring 332 to prevent separation of the cylinders 318 and 320.

Figure 7 shows a further modified form of the invention wherein the ring 428, which clamps the orifice carrying member 426 to the end of the cylinder 418 is provided with an upstanding ring 480 to engage the ring 432 to prevent separation of the cylinders 418 and 420.

In this embodiment it will be observed that a pressure actuated valve member 482 moves between a stop ring 484 fixed to the cylinder 418, and a shoulder 486 formed on the ring 428. The valve member 482 operates to close or open communication between the chamber 440 and the ports 442 in the walls of the cylinder 418 depending on whether the chamber 440 is subjected to pressure or suction as the strut is compressed or expanded. In this embodiment the metering orifices 450 are closed by the ring 432 when the strut is in the extended position.

Figures 8 and 9 show the metering pin and associated parts in detail. It will be observed that the pin 22 is fixed in the lower end of the cylinder 20 and projects through the orifice 24 formed in the member 26 clamped to the lower end of the cylinder 18 by the ring 28 as more clearly shown in Figure 3.

The pin 22 is of constant diameter throughout its length; has relatively small clearance with the walls forming the orifice 24, and is formed with grooves 23 on opposite sides thereof. As will be observed in Figure 8, the depth of the grooves 23 vary over the length of the pin to progressively vary the effective area of the orifice 24 as the metering pin 22 is projected therethrough. In the illustrated embodiment, the effective area of the orifice 24 is relatively small during the initial stages of operation when the cylinder 18 begins to slide into the cylinder 20, as represented by the section A of the pin. In the section B of the pin the grooves 23 are progressively deeper, thereby progressively increasing the effective orifice area. In the section C the grooves are of constant depth and in the section D the grooves are progressively more shallow. These relations may of course be varied to accomplish any desired results in a particular installation.

Attention is directed to the fact that if the pin 22 starts to vibrate, the relatively small clearance between the pin and the walls forming the orifice, limit the oscillations of the pin to prevent the building up of sufficient force in the pin to enlarge the orifice 24. The spaced grooves operate to distribute the liquid flow through the orifice 24 equally about the pin 22, thereby giving a balanced structure which will tend to retard surging of the liquid, and will limit vibration of the pin 22. The pin 22 being of constant diameter has a greater radius of gyration because the metal is positioned at a greater distance from the center of the pin. A more rigid pin which is less susceptible to vibration is therefore produced. Manufacturing tolerances therefore need not be maintained between such close limits, whereupon the manufacturing costs may be decreased.

If desired the pin 22 may have grooves 25 of constant depth as illustrated in Figure 10. In this embodiment the effective area of the orifice 24 may be varied by expanding the grooves 25 laterally of the pin as shown.

Figure 11 shows another desirable embodiment wherein the pin 22 is formed with spaced grooves 27 of varying depth and width to change the effective area of the orifice 24.

The embodiments illustrated in Figures 10 and 11 give a large solid section at the central portion of the pin which is desirable because the pin is less apt to fail because of fracture or impact loads to which it might be subjected when not in strut.

If desired the upper wall of the member 26, having the orifice 24 therein, may be formed with smooth curved walls, instead of the flat upper surface, to form a streamlined structure to guide the fluid flowing from the cylinder 20 to the cylinder 18, thereby decreasing turbulence of the fluid.

It is understood, of course, that the strut shown in the various embodiments hereof may be inverted, the outer cylinder 20 being positioned above the inner cylinder 18. In this case the liquid would of course fill the lower cylinder, which in the inverted position would be the inner cylinder 18.

While the invention has been described with particular reference to several desirable embodiments, it is to be understood that the disclosure is illustrative only, and that various features may be combined in any desired manner, and that many changes can be made without departing from the spirit of the invention as defined by the following claims.

I claim:

1. In a shock strut, a pair of telescoping liquid and fluid cylinders, guiding means associated with the cylinders to align them, packing means between the cylinders, a liquid chamber between the cylinders, connecting means extending transversely through the wall of one of said cylinders communicating with said chamber, pressure actuated valve means controlling the connecting means to admit liquid to said chamber freely as the cylinders are moved in the telescoping direction and to close the chamber to fluid when the cylinders are moving in the extended direction, and metering orifices to permit escape of liquid from said chamber.

2. In a hydro-pneumatic shock strut, a pair of telescoping cylinders, liquid and fluid in said cylinders, means including a metering pin and an orifice carrying member inter-connecting the cylinders to control the flow of liquid from one cylinder to the other, a chamber between the cylinders and communicating with one of said cylinders to receive liquid therefrom when the cylinders are moving in the collapsing direction, pressure responsive means controlling the admission of liquid to said chamber, and orifice means to permit the escape of liquid from said chamber as the cylinders are moving in the extended direction.

3. In a shock strut an outer liquid cylinder, an inner fluid cylinder, means including a member having an orifice therein closing the fluid cylinder and communicating with the liquid cylinder, and a metering pin carried by the liquid cylinder and projecting through said orifice to vary the effective area of the orifice as the strut is progressively compressed, said metering pin being formed with spaced grooves extending longitudinally thereof and proportioned to vary the effective orifice area as the fluid and liquid cylinders move in the telescoping direction to interpose a high constant resistance followed by a decreasing resistance followed by a constant resistance followed by an increasing resistance.

4. A shock strut comprising a liquid cylinder, a fluid cylinder, means including a member having a fixed orifice therein positioned between the cylinders, means including a metering pin associated with one of said cylinders and projecting through said orifice to vary the effective area of the orifice as the cylinders move with reference to each other, means to control the movement of the strut comprising a longitudinally expansible chamber positioned between the cylinders adapted to freely receive liquid through main and auxiliary orifices as the strut is compressed, means to close the main orifices when the strut moves in the expanding direction, and means to close the auxiliary orifices when the strut approaches the fully extended position.

5. In a shock strut an outer liquid cylinder, an inner fluid cylinder, means including a member having an orifice therein closing the fluid cylinder and communicating with the liquid cylinder, a metering pin carried by the liquid cylinder and projecting through said orifice to vary the effective area of the orifice as the strut is progressively compressed, said metering pin being formed with spaced grooves extending longitudinally thereof and proportioned to vary the effective orifice area as the fluid and liquid cylinders move in the telescoping direction to interpose a high constant resistance followed by a decreasing resistance followed by a constant resistance followed by an increasing resistance, means to control the expanding movement of the strut comprising an expansible chamber positioned between the cylinders adapted to receive liquid through the walls of one of the cylinders as the shock strut is compressed, differential pressure actuated means controlling the fluid receiving passages, and orifice means to control the rate of fluid flow from said chamber.

6. In a shock strut, a pair of telescoping cylinders, liquid and fluid in the cylinders, means including a plurality of rings carried by the cylinders to maintain the strut in assembled relation, a liquid chamber between the cylinders, spaced upper and lower connecting means between one of the cylinders and said chamber, and pressure responsive valve means to close the lower connecting means when the cylinders are moved in the extending direction.

7. In a shock strut, a pair of telescoping cylinders, liquid and compressible fluid in the cylinders, a liquid chamber between the cylinders, main and auxiliary orifice means extending through the walls of one of the cylinders to interconnect one of said cylinders and said chamber, and pressure responsive valve means controlling the main orifice to open the orifice when the cylinders are moving in the telescoping direction and to close said orifice when the cylinders are moving in the extending direction.

8. In a shock strut, inner and outer telescoping cylinders, liquid and compressible fluid in the cylinders, spaced stop means carried by the outer cylinder, sealing means positioned between said stop means, a liquid chamber between the cylinders and interposed between said stop means, main and auxiliary connecting means between one of the cylinders and said chamber, and check valve means concentrically mounted with reference to one of the cylinders to close the main connecting means when the cylinders are moving in the extending direction.

9. In a shock strut, a pair of telescoping cylinders, liquid and fluid in the cylinders, means including a plurality of rings carried by the cylinders to maintain the strut in assembled relation, a fluid chamber between the cylinders, spaced upper and lower connecting means between one of the cylinders and said chamber, and pressure responsive valve means to close the lower connecting means when the cylinders are moved in the extending direction, the upper connecting means being closed by one of said rings as the cylinders approach the fully extended position.

10. In a shock strut, inner and outer telescoping cylinders, liquid and compressible fluid in the cylinders, a liquid chamber between the cylinders, vertically spaced main and auxiliary orifice means interconnecting the inner cylinder and said chamber, and pressure responsive valve means concentrically mounted on the inner cylinder controlling the main orifice to open the orifice when the cylinders are moving in the telescoping direction and to close said orifice when the cylinders are moving in the extending direction, and means to close the auxiliary orifices when the strut approaches the fully extended position.

11. In a shock strut, inner and outer telescoping cylinders, liquid and fluid in the cylinders, spaced stop means carried by the outer cylinder, sealing means positioned between said stop means, a liquid chamber between the cylinders, main and auxiliary connecting means between one of the cylinders and said chamber, and check valve means concentrically mounted with reference to one of the cylinders to close the main connecting means when the cylinders are moving in the extending direction, the auxiliary connecting means being closed by said stop means as the strut approaches the fully extended position.

12. In a shock strut, inner and outer telescoping cylinders, liquid and fluid in the cylinders, means including rings carried by the inner and outer cylinders to maintain the strut in assembled relation, a fluid chamber betwen the cylinders, spaced upper and lower connecting means between the inner cylinder and said chamber, and pressure responsive valve means concentrically mounted on the inner cylinder adjacent said ring to close the lower connecting means when the cylinders are moved in the extending direction.

13. In a shock strut, inner and outer telescoping cylinders, liquid and compressible fluid in the cylinders, spaced stop means carried by the outer cylinder, sealing means positioned between said stop means, an abutment carried by the inner cylinder and adapted to engage said stop means, a liquid chamber between the cylinders, main and auxiliary connecting means between one of the cylinders and said chamber, and check valve means concentrically mounted with reference to the inner cylinder adjacent said abutment to close the main connecting means when the cylinders are moving in the extending direction.

14. A shock strut comprising inner and outer telescoping cylinders, liquid and fluid in the cylinders, a liquid chamber between the cylinders, main and auxiliary connecting means between one of the cylinders and said chamber, check valve means concentrically mounted with reference to one of the cylinders to close the main connecting means when the cylinders are moving in the extending direction, and means to close the auxiliary connecting means as the strut approaches the fully extended position.

15. In a shock strut, inner and outer telescoping cylinders, liquid and compressible fluid in the cylinders, a liquid chamber between the cylinders, main and auxiliary connecting means between one of the cylinders and said chamber, and check valve means concentrically mounted with reference to the inner cylinder to close the main connecting means when the cylinders are moving in the extending direction.

16. A metering pin for a hydro-pneumatic shock strut including telescoping liquid and fluid cylinders and an orifice-carrying member, comprising a longitudinally extending body member adapted to project through the orifice-carrying member and provided with grooves formed in the side walls thereof to cooperate with the orifice-carrying member to interpose a constant high resistance to the initial shock followed by a decreasing resistance followed by a constant resistance followed by an increasing resistance.

CARL V. JOHNSON.